United States Patent Office 3,286,525
Patented Nov. 22, 1966

3,286,525
DEVICE FOR THE THERMOELECTRIC MEASUREMENT OF THE TEMPERATURE OF ROTARY SPECIMEN CARRIERS
Fritz Grasenick, 12 Rechbauerstrasse, Graz, Austria
Filed June 29, 1964, Ser. No. 378,871
Claims priority, application Austria, July 3, 1963,
A 5,320
3 Claims. (Cl. 73—359)

The invention relates to a device for the thermoelectric measurement of the temperature of rotary specimen carriers, particularly of rotary plates for specimens used in electronic microscopy.

An arrangement is already known wherein the temperature of the rotary specimen carrier is measured by means of a thermocouple in contact with the specimen carrier at one point or trailing on same, the junction of the two metallic conductors (generally constantan and copper) being in point contact only with the specimen carrier. For that reason, the actual temperature of the thermocouple may differ from that of the specimen carrier, so that the thermoelectric voltage readable on the measuring instruments is different from the real temperature of the specimen carrier. This false reading will occur whenever—as is usually the case—there is a temperature difference within the cross-section of the thermocouple, different thermoelectric voltages prevailing within the said cross-section depending on its distance from the specimen carrier, so that the thermoelectric voltage reading of the instrument represents an average figure for the entire cross-section. If this average figure for the thermoelectric voltage were to remain constant at all times, the difference between the reading and the actual temperature could be measured and corrected by appropriate action. However, this is not possible on account of such factors as the continuous change of the temperature difference even if the temperature of the specimen carrier remained always the same. Consequently, the inaccuracy of the readings of conventional measuring instruments may vary between 10 and 50 degrees centigrade.

It is the object of the invention to eliminate these shortcomings of conventional devices by providing an instrument ensuring maximum accuracy of readings for measuring the actual temperature of rotary specimen carriers by the thermoelectric method. According to the invention, a metal ring, for example a ring made of constantan, is pressed or soldered into the specimen carrier so as to constitute in conjunction with the specimen carrier made from some other metal, such as copper, the thermocouple for the measurement of temperatures. The outstanding advantage of this arrangement resides in the fact that the thermoelectric voltage produced between the specimen carrier and the metal ring is the equivalent of the actual temperature of the specimen carrier. As a result of the intimate connection between the specimen carrier and the metal ring, the latter will follow any change of temperature of the specimen carrier almost without delay, so that the thermoelectric voltage reading of an appropriate instrument approximately indicates the temperature of the specimen carrier at that particular moment.

In a preferred embodiment of the invention two sliders are provided for collecting the thermoelectric voltage prevailing between the specimen carrier and the metal ring, one of said sliders elastically adjoining the specimen carrier and the other the metal ring, the slider and the portion of the thermocouple in contact therewith being made of the same metal. This positively precludes additional thermoelectric voltages at the points of contact between the sliders and the specimen carrier and the metal ring respectively, which would produce gross misreadings. In addition, the electric contact resistance at the points of contact of the two sliders is relatively low and negligible as compared with the circuit resistance produced by the lead-in wires and the measuring instrument (galvanometer). Consequently, minor variations of the contact resistance such as are produced by the rotation of the specimen carrier and by changes in the pressure applied by the sliders are unimportant. Practical tests have shown the accuracy of measurements to be considerably better than the degree of accuracy attainable by conventional devices, since discrepancies are of the order of a few tenths of a degree centigrade only.

Further details of the invention will appear from the following description of an embodiment and of an example of installation of a device according to the invention with reference to the accompanying drawing in which:

FIG. 1 shows the schematic arrangement of the device according to the invention, and FIG. 2 is an axial cross-sectional view of the device mounted on the lifting platform of a treatment chamber.

The rotary specimen carrier 1 (FIG. 1) is designed as a circular disk comprising a cylindrical shaft 6 on its underside, rigidly or movably secured inside a treatment chamber (by means not shown in the drawing). The upper even circular surface 1' of the specimen carrier 1 serves to receive specimens (not shown), such as preparations used in electronic microscopy and the like. A flat metal ring 2, made of constantan, for example, is inserted in the lower circular surface 1" of the specimen carrier 1 by pressing or soldering, said metal ring constituting a thermocouple in conjunction with the specimen carrier 1 made of some other metal, such as copper.

To the underside of the specimen carrier 1 a slider 3 is elastically applied, said slider being made of the same metal as the specimen carrier 1. Furthermore, another elastic slider 4 is applied to the free surface of the metal ring 2, the latter slider being made of the same material as the metal ring 2. The sliders 3 and 4 collect the thermoelectric voltage produced between the specimen carrier 1 and the metal ring 2 and deliver the same to the measuring instrument 5 (galvanometer). The thermoelectric voltage reading of the measuring instrument is, therefore, a measure for the temperature of the specimen carrier 1. The scale of the measuring instrument 5 can be so designed as to permit the direct reading of the said temperature.

If the device according to the invention is arranged inside a treatment chamber, the specimen carrier 7 is provided with a concentrical elastic extension 8 by means of which it can be mounted on the axle 9 of the specimen carrier 7. A conical member 10 assures the correct axial position of the specimen carrier 7 so that the surface 11 of the latter is maintained in the axis of oscillation 12. The axle 9 is concentrically and rotatably located in a bushing 13 inserted in an aperture provided in the center of the stirrup 14. For this purpose, a double ball-bearing 15 is provided for the driving pulley 16 to be secured to the axle 9 by means of fastening rings 17, 18 screwed onto the axle 9. The axle journal 19 carries a pinion 20 mounte don ball-bearings and integral and rotating with the pulley 21. The axle journal 19 carries a pinion 20 mounted on ball-bearings and integral and rotating with the pulley 21. The axle journal 19 is also secured to a lug 22 of the element 23. The other extremity of the axle journal 19 forms a support for the stirrup 14. On the right extremity of the member 23 the axle journal is mounted in the same manner as the axle journal 24 in the lug 25. At the right, the pinion 26 is secured to the stirrup 14.

In order to drive the pulley 16 by means of the elastic belt 27 by means of two idler pulleys 28 mounted on the bracket 29, it will be noted that the belt 27 is shown in FIG. 2 with a dot-and-dash line. The two worm gears of which only the one on the left is shown, are axially movable with the drive spindle 30 by means of a key member 31 which slides in a groove 32 in the driving spindle.

Current is collected from the specimen carrier 7 via two elastic contact pins 33, 34 located parallel to the axis of rotation of the specimen carrier 7 in insulated guide sleeves 35 on the pivoting stirrup 14. The contact pin 33 located closer to the axis of rotation of the specimen carrier 7 rests with its front face on the free outer surface of the metal ring 36 of the specimen carrier 7 whereas the other contact pin 34 rests directly on the underside 37 of the specimen carrier 7.

The contact pin 33 is made of the same metal as the ring 36, whereas the contact pin 34 is of the same metal as the specimen carrier 7.

The elastic contact pins 33, 34 are in electrical connection with the contact rings 38, 39 rigidly mounted on the stirrup by means of an insulating disk 40. Consequently, the current flows through the elastic contact members 41, 42 which are insulated in the support member 23.

The measuring instrument (not shown in FIG. 2) is connected with the thermocouple via two contact tongues 41, 42.

I claim:

1. A device for the thermoelectric measurement of the temperature of rotary specimen carriers, particularly of the temperature of rotary plates for preparations used in electronic microscopy in a treatment chamber, comprising a specimen carrier made of metal, such as copper, a metal ring made of some other metal such as the allow constantan, the said metal ring being electrically conductive and positively connected with the said specimen carrier, the latter constituting in conjunction with the metal ring a thermocouple for the measurement of the temperature of the specimen carrier and said ring being in direct thermal and electrical contact with the face of the disc.

2. A device as claimed in claim 1, comprising a current collector elastically applied to the said specimen carrier and made of the same metal as the specimen carrier, another current collector, elastically applied to the said metal ring and made of the same metal as the metal ring, the said current collectors serving to collect the thermoelectric voltage produced between the said specimen carrier and the said metal ring.

3. A device as claimed in claim 1, providing an annular groove in the said specimen carrier, the said metal ring being pressed into the said annular groove of the specimen carrier.

References Cited by the Examiner

UNITED STATES PATENTS 1,557,387  10/1925  Thwing _____ 73—351
2,694,313  11/1954  Niewan _____ 73—351

FOREIGN PATENTS 585,119  11/1958  Italy.

LOUIS R. PRINCE, *Primary Examiner.*

DONN McGIEHAN, *Assistant Examiner.*